US011696168B2

(12) United States Patent
Iwai

(10) Patent No.: US 11,696,168 B2
(45) Date of Patent: Jul. 4, 2023

(54) MTC-IFW ENTITY, PCFR ENTITY, AND COMMUNICATION METHOD

(71) Applicant: NEC CORPORATION, Tokyo (JP)

(72) Inventor: Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 89 days.

(21) Appl. No.: 15/109,467

(22) PCT Filed: Dec. 4, 2014

(86) PCT No.: PCT/JP2014/006053
§ 371 (c)(1),
(2) Date: Jul. 1, 2016

(87) PCT Pub. No.: WO2015/104751
PCT Pub. Date: Jul. 16, 2015

(65) Prior Publication Data
US 2016/0330647 A1    Nov. 10, 2016

(30) Foreign Application Priority Data
Jan. 9, 2014 (JP) ................................ 2014-002755

(51) Int. Cl.
*H04W 4/00* (2018.01)
*H04W 28/02* (2009.01)
(Continued)

(52) U.S. Cl.
CPC ..... *H04W 28/0268* (2013.01); *H04L 12/1407* (2013.01); *H04L 65/80* (2013.01);
(Continued)

(58) Field of Classification Search
None
See application file for complete search history.

(56) References Cited

U.S. PATENT DOCUMENTS 9,654,900 B2 * 5/2017 Seed ...................... H04W 4/005
2007/0115861 A1   5/2007 Zhang et al.
(Continued)

FOREIGN PATENT DOCUMENTS

EP          2385721 A1     11/2011
JP       2013-176042 A      9/2013
(Continued)

OTHER PUBLICATIONS

MediaTek Inc., "Optimization of NAS procedure for the delivery of MTC device trigger to idle mode UE", 3GPP TSG-SA WG2, Feb. 6-10, 2012, Meeting #89, S2-120808, Vancouver, Canada, 5pgs.
(Continued)

*Primary Examiner* — Bob A Phunkulh
(74) *Attorney, Agent, or Firm* — Sughrue Mion, PLLC

(57) ABSTRACT

A Machine Type Communication Inter Working Function (MTC-IWF) entity (1) is configured to, in response to receiving from a Service Capability Server (SCS) a first request for quality of service to be applied to a specific communication of an MTC device, send to a Policy and Charging Rule Function (PCRF) entity a second request for applying the quality of service to the specific communication. It is thus possible, for example, to facilitate controlling quality of service of a specific communication in a Public Land Mobile Network (PLMN) in response to a request by the SCS for the quality of service.

19 Claims, 6 Drawing Sheets

(51) Int. Cl.
  *H04L 65/80* (2022.01)
  *H04L 12/14* (2006.01)
  *H04M 15/00* (2006.01)
  *H04W 4/70* (2018.01)
  *H04W 4/24* (2018.01)
  *H04W 88/16* (2009.01)
  *H04L 65/1083* (2022.01)
  *H04L 65/1063* (2022.01)

(52) U.S. Cl.
  CPC .......... *H04M 15/64* (2013.01); *H04M 15/66* (2013.01); *H04W 4/24* (2013.01); *H04W 4/70* (2018.02); *H04L 65/1063* (2013.01); *H04L 65/1083* (2013.01); *H04W 88/16* (2013.01)

(56) References Cited

U.S. PATENT DOCUMENTS

| | | | |
|---|---|---|---|
| 2009/0238207 A1 | 9/2009 | Zhao et al. | |
| 2010/0091671 A1 | 4/2010 | Lidstrom et al. | |
| 2012/0144049 A1* | 6/2012 | Lopez Nieto | H04L 12/14 709/228 |
| 2012/0182868 A1* | 7/2012 | Lovsen | H04L 47/263 370/230 |
| 2012/0224531 A1 | 9/2012 | Karuturi et al. | |
| 2012/0246325 A1* | 9/2012 | Pancorbo Marcos | H04L 63/102 709/227 |
| 2013/0017827 A1* | 1/2013 | Muhanna | H04W 80/04 455/426.1 |
| 2013/0089033 A1* | 4/2013 | Kahn | H04W 28/22 370/329 |
| 2013/0107799 A1* | 5/2013 | Karlsson | H04L 67/306 370/328 |
| 2013/0182644 A1* | 7/2013 | Kim | H04W 28/0215 370/328 |
| 2013/0196630 A1 | 8/2013 | Ungvari et al. | |
| 2013/0201830 A1* | 8/2013 | Wang | H04W 4/005 370/235 |
| 2013/0279521 A1* | 10/2013 | Perez Martinez | H04L 12/1407 370/468 |
| 2014/0094138 A1* | 4/2014 | Saker | H04L 12/1407 455/406 |
| 2014/0134996 A1* | 5/2014 | Barclay | G06F 9/4881 455/422.1 |
| 2014/0148158 A1* | 5/2014 | Cho | H04W 28/14 455/435.1 |
| 2014/0153391 A1* | 6/2014 | Ludwig | H04L 41/0816 370/230 |
| 2014/0269779 A1* | 9/2014 | Shan | H04W 36/14 370/509 |
| 2014/0274186 A1* | 9/2014 | Cai | H04W 4/005 455/517 |
| 2015/0049610 A1* | 2/2015 | Kim | H04W 4/005 370/233 |
| 2015/0049668 A1* | 2/2015 | Cho | H04W 48/18 370/328 |
| 2015/0103684 A1* | 4/2015 | Xu | H04W 4/005 370/252 |
| 2015/0117347 A1* | 4/2015 | Iwai | H04W 76/041 370/329 |
| 2015/0131437 A1* | 5/2015 | Kim | H04W 28/0289 370/230 |
| 2015/0195671 A1* | 7/2015 | Seed | H04L 67/16 455/434 |
| 2015/0215186 A1* | 7/2015 | Alonso Franco | H04L 63/102 709/224 |
| 2015/0236914 A1* | 8/2015 | Woods | H04L 41/0893 370/230 |
| 2015/0245196 A1* | 8/2015 | Rivas Molina | H04W 8/186 370/259 |
| 2015/0249900 A1* | 9/2015 | Kim | H04W 24/10 370/252 |
| 2015/0282177 A1* | 10/2015 | Dong | H04L 43/103 370/329 |
| 2015/0289078 A1* | 10/2015 | Kim | H04W 4/005 455/422.1 |
| 2015/0296321 A1* | 10/2015 | Kim | H04W 8/02 370/329 |
| 2015/0296557 A1* | 10/2015 | Kim | H04W 4/005 370/331 |
| 2015/0319058 A1* | 11/2015 | Molinero Fernandez | H04L 41/0613 370/329 |
| 2015/0341889 A1* | 11/2015 | Starsinic | H04W 4/70 370/329 |
| 2015/0358229 A1* | 12/2015 | Steinacker | H04L 45/22 370/392 |
| 2015/0358240 A1* | 12/2015 | Hong | H04L 47/20 370/410 |
| 2016/0014154 A1* | 1/2016 | Huang | H04L 63/20 726/1 |
| 2016/0014635 A1* | 1/2016 | Rasanen | H04L 47/14 370/230 |
| 2016/0080578 A1* | 3/2016 | Stenfelt | H04L 41/5025 455/406 |
| 2016/0142860 A1* | 5/2016 | Kim | H04W 60/00 455/435.1 |
| 2016/0156529 A1* | 6/2016 | Navas Cornejo | H04L 41/5067 709/223 |

FOREIGN PATENT DOCUMENTS

| | | |
|---|---|---|
| RU | 2 411 674 C2 | 2/2011 |
| RU | 2 417 530 C2 | 4/2011 |
| WO | 2004/112419 A1 | 12/2004 |
| WO | 2012/118967 A1 | 9/2012 |
| WO | 2013/011433 A1 | 1/2013 |
| WO | 2013/046620 A1 | 4/2013 |
| WO | 2013/109061 A1 | 7/2013 |
| WO | 2013/113263 A1 | 8/2013 |
| WO | 2013/141625 A1 | 9/2013 |
| WO | 2013/161233 A1 | 10/2013 |
| WO | 2013/161243 A1 | 10/2013 |
| WO | 2013161275 A1 | 10/2013 |
| WO | 2014/004965 A1 | 1/2014 |

OTHER PUBLICATIONS

3GPP TS 23.682 V11.5.0, "Architecture enhancements to facilitate communications with packet data networks and applications, (Release 11)", 3rd Generation Partnership Project, Technical Specification Group Services and System Aspects, Sep. 2013.

3GPP TS 23.203 V11.11.0, "Policy and charging control architecture, (Release 11)", 3rd Generation Partnership Project, Technical Specification Group Services and System Aspects, Sep. 2013.

3GPP TS 29.213 V11.8.0, "Policy and Charging Control signaling flows and Quality of Service (QoS) parameter mapping, (Release 11)", 3rd Generation Partnership Project, Technical Specification Group Core Network and Terminals, Sep. 2013.

International Search Report for PCT/JP2014/006053 dated Mar. 10, 2015.

"3rd Generation Partnership Project; Technical Specification Group Services and System Aspects; Policy and charging control architecture (Release 11)", 3GPP TS 23.203, V11.12.0 (Dec. 2013), 2013, pp. 1-182 (182 pages).

Communication dated Jul. 11, 2017 from the European Patent Office in counterpart European application No. 14878211.3.

Communication dated Oct. 17, 2017 from the Russian Patent and Trademark Office in counterpart application No. 2016131335/07(048674).

CATT, "Obtaining reachability state of MTC device via PCRF", 3GPP TSG-SA WG2#85, S2-112567, May 16-20, 2011 (2 pages).

Nokia Siemens Networks, "Onetime reporting of the present Access Network Information", SA WG2 Meeting #97, S2-131726, May 27-31, 2013 (11 pages).

(56) References Cited

OTHER PUBLICATIONS

Huawei, HiSilicon, Intel, China Unicom, China Telecom, China Mobile, ZTE, LG Electronics, ITRI, Broadcom Corporation, NSN, KPN, Silver Spring Networks, InterDigital, Sierra Wireless, HTC, KT Corp, III, CATT, Telecom Italia, Sony, Acision, Orange, NEC, "Overview of normative changes for the Small Data Service", 3GPP TSG-SA WG 2#100, S2-134199, Nov. 11-15, 2013 (8 pages).

Communication dated Oct. 2, 2018, from Japanese Patent Office in counterpart application No. 2015-556632.

Communication dated Dec. 25, 2018, from State Intellectual Property Office of the P.R.C. in counterpart application No. 201480076867.3.

Japanese Office Communication for JP Application No. 2020-053958 dated Sep. 7, 2021 with English Translation.

Japanese Office Action for JP Application No. 2020-53958 dated Jun. 14, 2022 with English Translation.

JP Office Action for JP Application No. 2021-181256, dated Feb. 7, 2023 with English Translation.

\* cited by examiner

MTC-IFW ENTITY, PCFR ENTITY, AND COMMUNICATION METHOD

CROSS REFERENCE TO RELATED APPLICATIONS

This application is a National Stage of International Application No. PCT/JP2014/006053 filed Dec. 4, 2014, claiming priority based on Japanese Patent Application No. 2014-002755 filed Jan. 9, 2014, the contents of all of which are incorporated herein by reference in their entirety.

TECHNICAL FIELD

The present application relates to control of quality of services in a wireless communication system.

BACKGROUND ART

The Third Generation Partnership Project (3GPP) has examined the standardization of the Machine Type Communication (MTC). The MTC is also referred to as a Machine-to-Machine (M2M) network or a sensor network. The 3GPP defines mobile stations (MSs, USs) implemented in machines and sensors for the MTC as "MTC devices". The MTC devices are typically placed in various types of equipment including machines (e.g., vending machines, gas meters, electric meters, vehicles, railway vehicles) and sensors (e.g., environmental, agricultural, or traffic sensors). The MTC devices are connected to a Public Land Mobile Network (PLMN) and communicate with an MTC application server (AS). The MTC application server is placed outside the PLMN (i.e., placed in an external network), executes an MTC application, and communicates with MTC UE applications implemented in the MTC devices. The MTC application server is typically controlled by an MTC service provider (M2M service provider).

The 3GPP specifies network elements including a Service Capability Server (SCS) and a Machine Type Communication Inter Working Function (MTC-IWF), reference points, and procedures to allow the MTC application server to communicate with the MTC devices (see Non-patent literature 1). The reference points are also referred to as "interfaces".

The SCS is an entity to connect the MTC application server to the 3GPP PLMN and to allow the MTC application server to communicate with a UE (i.e., MTC device) through PLMN services defined by the 3GPP. Further, the SCS allows the MTC application server to communicate with the MTC-IWF. The SCS is assumed to be controlled by an operator of the PLMN or the MTC service provider.

The MTC-IWF is a control-plane entity that belongs to the PLMN. The MTC-IWF has a signaling interface (reference point) with the SCS and has signaling interfaces (reference points) with nodes in the PLMN (e.g., Home Subscriber Server (HSS), a Short Message Service-Service Center (SMS-SC), a Serving GPRS Support Node (SGSN), a Mobility Management Entity (MME), and a Mobile Switching Center (MSC)). The MTC-IWF serves as a control-plane interface to allow the 3GPP PLMN and the M2M service layer including the SCS to interwork with each other while hiding the details of the topology of the 3GPP PLMN.

Non Patent Literature 2 discloses in Section 7.4.2 the PCRF initiated IP-CAN Session Modification procedure. In one example, a Policy and Charging Rules Function (PCRF) initiates an IP-CAN Session Modification procedure in response to the detection of application traffic (e.g., streaming video service, VoIP service, P2P file sharing service, specific HTTP traffic) by a Traffic Detection Function (TDF). In another example, the PCRF initiates the IP-CAN Session Modification procedure in response to service information (e.g., a change in priority level) provided or revoked by an Application Function (AF). Non Patent Literature 3 discloses in Section 4.3.1 the IP-CAN Session Modification procedure, which is like the one disclosed in Non Patent Literature 2.

CITATION LIST

Non Patent Literature

[Non Patent Literature 1] 3GPP TS 23.682 V11.5.0 (2013-09) "3rd Generation Partnership Project; Technical Specification Group Services and System Aspects; Architecture enhancements to facilitate communications with packet data networks and applications (Release 11)", September 2013

[Non Patent Literature 2] 3GPP TS 23.203 V11.11.0 (2013-09) "3rd Generation Partnership Project; Technical Specification Group Services and System Aspects; Policy and charging control architecture (Release 11)", September 2013

[Non Patent Literature 3] 3GPP TS 29.213 V11.8.0 (2013-09) "3rd Generation Partnership Project; Technical Specification Group Core Network and Terminals; Policy and Charging Control signaling flows and Quality of Service (QoS) parameter mapping (Release 11)", September 2013

SUMMARY OF INVENTION

Technical Problem

The present inventor has examined various use cases of the MTC application. For example, it is contemplated that a Public Land Mobile Network (PLMN) dynamically adjusts the quality of service of a specific communication (service data flow) regarding a UE (MTC device), such as a QoS policy (e.g., QoS Class Identifier (QCI), Allocation and Retention Priority (ARP), Maximum Bit Rate (MBR), Guaranteed Bit Rate (GBR)), in response to a request by an MTC application server. In order to implement this use case, for example, it may be preferable that the MTC-IWF is able to request a network element in the PLMN to control the quality of service (QoS control) of a specific communication, in response to receiving from the SCS a request for the quality of service. However, Non Patent Literatures 1 to 3 fail to teach such control operation or control procedure.

In view of the above, one object of embodiments disclosed in this specification is to provide an MTC-IWF entity, a PCRF entity, a control method and a program for facilitating controlling quality of service of a specific communication in a PLMN in response to a request by an SCS for the quality of service. The other objects or problems and novel features will become apparent from the description of the specification or the accompanying drawings.

Solution to Problem

In one aspect, an MTC-IWF entity includes a control unit. The control unit is configured to, in response to receiving from an SCS a first request for quality of service to be applied to a specific communication of an MTC device, send to a PCRF entity a second request for applying the quality of service to the specific communication.

In one aspect, a method performed by an MTC-IWF entity includes, in response to receiving from an SCS a first request for quality of service to be applied to a specific communication of an MTC device, sending to a PCRF entity a second request for applying the quality of service to the specific communication.

In one aspect, a program contains instructions for causing a computer to execute the method performed by an MTC-IWF entity described in the immediately above paragraph.

In one aspect, a PCRF entity includes a control unit. The control unit is configured to, in response to receiving from an MTC-IWF entity a request for quality of service to be applied to a specific communication of an MTC device, perform control for applying the quality of service to the specific communication.

In one aspect, a method performed by a PCRF entity includes, in response to receiving from an MTC-IWF entity a request for quality of service to be applied to a specific communication of an MTC device, performing control for applying the quality of service to the specific communication.

In one aspect, a program contains instructions for causing a computer to execute the method performed by a PCRF entity described in the immediately above paragraph.

In one aspect, a PCRF entity includes a control unit. The control unit is configured to, in response to detection of a specific packet flow from user traffic sent or received by a mobile station through a bearer already set up, provides, to a PCRF node having a Policy and Charging Enforcement Function (PCEF), a first Policy and Charging Control (PCC) rule to be applied to the specific packet flow. In one example, the mobile station may be an MTC device. In this case, the control unit may provide the first PCC rule to the PCEF node in response to receiving from an MTC-IWF entity a request for quality of service to be applied to a specific communication of the MTC device.

In one aspect, a method performed by a PCRF entity includes, in response to detection of a specific packet flow from user traffic sent or received by a mobile station through a bearer already set up, providing, to a PCRF node having a Policy and Charging Enforcement Function (PCEF), a first Policy and Charging Control (PCC) rule to be applied to the specific packet flow. In one example, the mobile station may be an MTC device. In this case, the providing may include providing the first PCC rule to the PCEF node in response to receiving from an MTC-IWF entity a request for quality of service to be applied to a specific communication of the MTC device.

In one aspect, a program contains instructions for causing a computer to execute the method performed by a PCRF entity described in the immediately above paragraph.

Advantageous Effects of Invention

According to the aspects described above, it is possible to provide an MTC-IWF entity, a PCRF entity, a control method and a program for facilitating controlling quality of service of a specific communication in a PLMN in response to a request by an SCS for the quality of service.

DESCRIPTION OF EMBODIMENTS

Specific embodiments will be explained hereinafter in detail with reference to the drawings. The same symbols are assigned to the same or corresponding elements throughout the drawings, and repetitive explanations will be omitted as necessary.

First Embodiment

Figure 1:
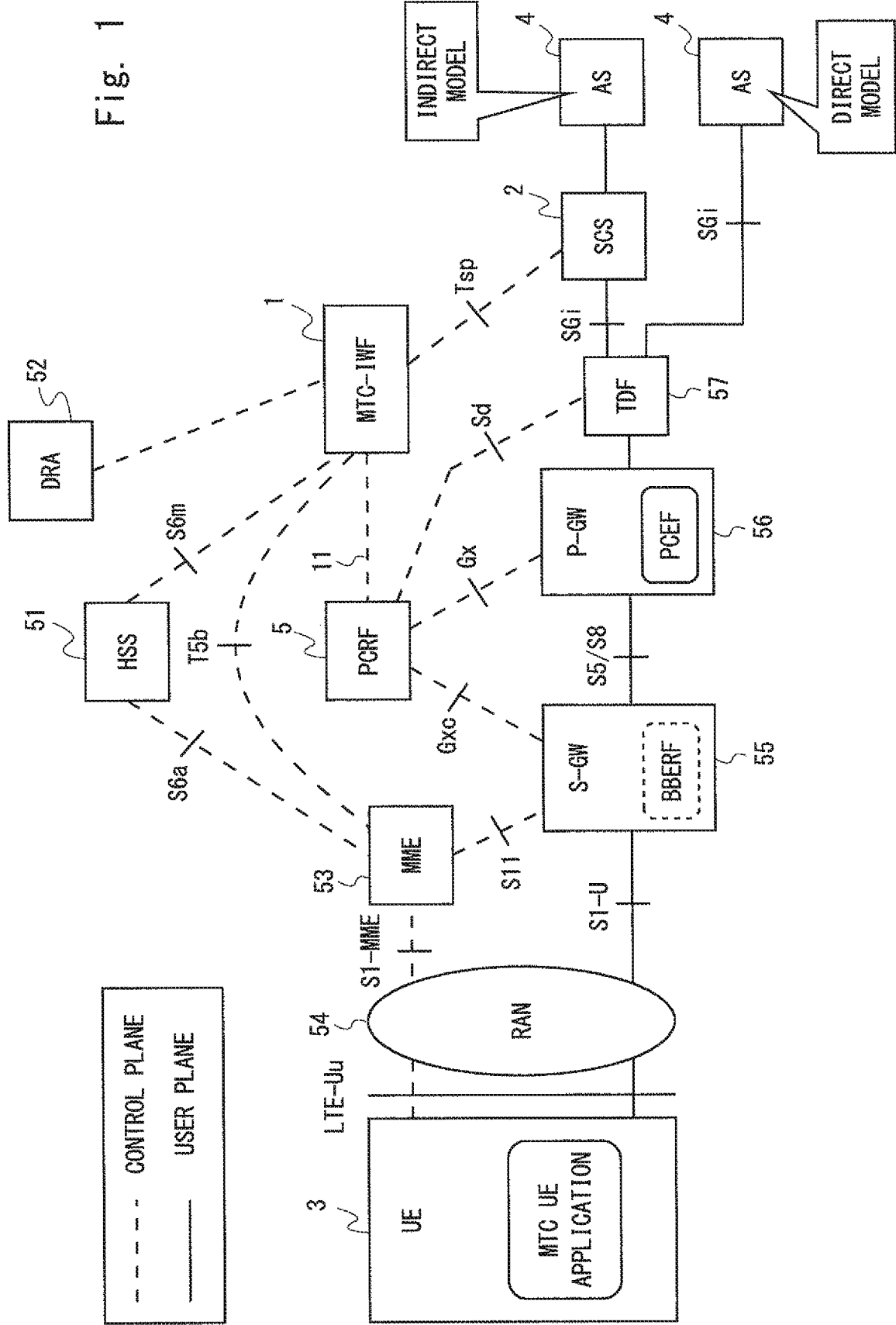
FIG. 1 is a diagram showing a wireless communication system according to first and second embodiments.

FIG. 1 is a diagram showing a configuration example of a wireless communication system according to this embodiment. The wireless communication system according to this embodiment is, for example, a 3GPP wireless communication system (EPS). The EPS is also referred to as a Long Term Evolution (LTE) system. Hereinafter, the case where the wireless communication system according to this embodiment is the EPS is described by way of illustration. Note that, however, this embodiment is also applicable to another wireless communication system such as Universal Mobile Telecommunications System (UMTS).

A UE 3 executes an MTC UE application 31 and serves as an MTC device. The UE 3 as an MTC device is connected to an MME 53 through a Radio Access Network (RAN) 54 and communicates with an MTC application server 4. The RAN 54 includes an Evolved UMTS Terrestrial Radio Access Network (E-UTRAN).

The UE 3 may be an MTC gateway device. The MTC gateway device has a 3GPP mobile communication function (i.e., functions of a UE) and is connected to an adjacent device (e.g., a sensor, a radio frequency identification (RFID) tag, a car navigation device) by a personal/local area connection technology. Specific examples of the personal/local area connection technology include IEEE 802.15, ZigBee (registered trademark), Bluetooth (registered trademark), and IEEE 802.11a. The adjacent device, which is connected to the MTC gateway device, is typically a device that does not have the 3GPP mobile communication function, but may be a device that has the 3GPP mobile communication function (i.e., an MTC device).

In this specification, the term "MTC device" and the term "MTC gateway device" are not particularly distinguished from each other. Accordingly, the term "MTC device" used in this specification includes the MTC gateway device. Therefore, the UE 3 as the MTC device also means the UE 3 as the MTC gateway device.

An MTC Inter Working Function (MTC-IWF) entity 1 is a control-plane entity that belongs to the PLMN. The MTC-IWF entity 1 communicates with other network elements through signaling interfaces (reference points). The MTC-IWF entity 1 serves as a control-plane interface or gateway to allow a 3GPP PLMN and an M2M service layer including an SCS 2 to interwork with each other while hiding the details of the topology of the 3GPP PLMN.

Hereinafter, the signaling interfaces (reference points) of the MTC-IWF entity 1 and the other network elements are described.

The MTC-IWF entity 1 communicates with a Service Capability Server (SCS) 2 through a Tsp reference point. The SCS 2 connects the MTC application server 4 to the PLMN and allows the MTC application server 4 to communicate with the UE 3 (i.e., MTC device) through PLMN services defined by the 3GPP. The MTC application server 4 is also referred to as an M2M application server. Further, the SCS 2 allows the MTC application server 4 to communicate with the MTC-IWF entity 1. The SCS 2 is controlled by an operator of the PLMN or by an MTC service provider. The SCS 2 is also referred to as an MTC server or an M2M server. The SCS 2 may be a single, stand-alone physical entity or may be a functional entity added to another network element (e.g., MTC application server 4). The Tsp reference point is used, for example, to send a device trigger transmission request (Device Trigger Request (DTR)) from the SCS 2 to the MTC-IWF entity 1 and to report a device trigger result from the MTC-IWF entity 1 to the SCS 2.

The MTC-IWF entity 1 communicates with a Home Subscriber Server (HSS) 51 through an S6m reference point. The HSS 51 is a control-plane node placed in a core network of the PLMN (i.e., Evolved Packet Core (EPC) in the EPS) and manages subscriber information of the UE 3. The S6m reference point is used, for example, to send an inquiry as to the subscriber information from the MTC-IWF entity 1 to the HSS 51 and to send the subscriber information from the HSS 51 to the MTC-IWF entity 1.

The MTC-IWF entity 1 communicates with a Mobility Management Entity (MME) 53 through a T5b reference point. The MME 53 is a core network node of the EPS and performs mobility management (e.g., position registration) of the UE 3, bearer management (e.g., bearer establishment, bearer configuration modification, and bearer release), and the like. The MME 53 sends and receives control messages to and from a node (i.e., eNodeB) in the RAN 54, and sends and receives NAS messages to and from the UE 3. The NAS messages are not terminated at the RAN 54 and transparently transmitted and received between the UE 3 and the MME 53 without depending on the radio access technology used in of the RAN.

The above-described Tsp, S6m, and T5b reference points are defined in Non Patent Literature 1. However, Non Patent Literature 1 does not define reference points between the MTC-IWF entity 1 and a PCRF entity 5, and between the MTC-IWF entity 1 and a Diameter Routing Agent (DRA) 52.

A Policy and Charging Rules Function (PCRF) entity 5 is a control-plane entity that is placed in a core network (i.e., EPC) of the EPS. The PCRF entity 5 determines a Policy and Charging Control (PCC) rule to be applied to a service data flow of the UE 3 and sends the determined PCC rule to a P-GW 56 having a Policy and Charging Enforcement Function (PCEF). The PCC rule contains a QoS policy to be applied to a service data flow of the UE 3, a charging rule, and a service data flow (SDF) template for detecting the service data flow. Further, the PCRF entity 5 provides an Application Detection and Control (ADC) rule to a Traffic Detection Function (TDF) entity 57. The ADC rule is used in the TDF entity 57 in order to detect specific application traffic (e.g., streaming video service, VoIP service, P2P file sharing service, specific HTTP traffic) from user data traffic sent or received by the UE 3. The ADC rule contains identification information of Layers 4-7 of the OSI reference model which is required for identifying the application traffic.

The PCRF entity 5 has a signaling interface (i.e., Gx reference point) with the Policy and Charging Enforcement Function (PCEF) placed in the P-GW 56. The PCRF entity 5 has a signaling interface (i.e., Sd reference point) with the Traffic Detection Function (TDF) entity 57. Further, the PCRF entity 5 has a signaling interface (i.e., Gxc reference point) with a Bearer Binding and Event Reporting Function (BBERF) placed in an S-GW 55.

Further, the PCRF entity 5 has a signaling interface 11 with the MTC-IWF entity 1. The signaling interface 11 may be an Rx reference point. The Rx reference point is an interface between the PCRF and an Application Function (AF). In this case, the PCRF entity 5 may receive application-level service information from the MTC-IWF entity 1, determine a PCC rule, and provide the PCC rule to the P-GW 56.

A Diameter Routing Agent (DRA) 52 is a control-plane entity that is placed in a core network (EPC) of the EPS. The DRA 52 makes it possible to place a plurality of PCRF entities in the core network (EPC). Specifically, the DRA 52 associates a subscriber (UE 3) using the PLMN with a PCRF entity that performs QoS control and charging control on an IP-CAN session of the subscriber. The details of the function of the DRA are described in the 3GPP TS 29.213 and the IETF RFC 3588.

The DRA 52 may be implemented as a Redirect DRA or as a Proxy DRA. When the DRA 52 is implemented as a Redirect DRA, in response to receiving a Diameter request message from a client (e.g., Application Function (AF), the S-GW 55 as BBERF, the P-GW 56 as PCEF, and the MTC-IWF entity 1), the DRA 52 sends a Diameter Attribute-value pair (Diameter AVP) back to the client. The Diameter AVP (i.e., Redirect-Host-Usage AVP) sent from the DRA 52 indicates a PCRF entity to which the client should send the Diameter request message. When the DRA 52 is implemented as a Proxy DRA, in response to receiving a Diameter request message from a client (e.g., Application Function (AF), the S-GW 55 as BBERF, the P-GW 56 as PCEF, and the MTC-IWF entity 1), the DRA 52 transfers the received Diameter request message to an appropriate PCRF entity.

Note that, when there is only one MTC-IWF entity 1 in the PLMN, or when the MTC-IWF entity 1 knows in advance the PCRF entity 5 that manages the IP-CAN session of the UE 3 as an MTC device, for example, a signaling interface 12 between the MTC-IWF entity 1 and the DRA 52 may be omitted. In other words, the MTC-IWF entity 1 does not necessarily perform signaling with the DRA 52.

A Serving Gateway (S-GW) 55 is a user-plane packet-transfer node placed in a core network of the EPS, and it transfers user data packets of the UE 3. The S-GW 55 serves as a gateway to the RAN 54. The S-GW 55 has a user-plane tunneling interface (i.e., S1-U reference point) with the RAN 54 (i.e., E-UTRAN) and has a user-pale tunneling interface (i.e., S5/S8 reference point) with the P-GW 56. The S-GW 55 has a signaling interface (i.e., S11 reference point) with the MME 53.

Further, the S-GW 55 may have a Bearer Binding and Event Reporting Function (BBERF). The S-GW 55 serving as a BBERF receives a QoS rule from the PCRF entity 5, detects a service data flow (i.e., IP packet flow) of the UE 3, which is to be controlled based on the QoS rule, and associates the detected service data flow with an appropriate IP-CAN bearer (EPS bearer) corresponding to the QoS rule.

Further, the S-GW 55 serving as a BBERF reports an event to the PCRF entity 5 based on an event trigger installed by the PCRF entity 5.

A Packet Data Network Gateway (P-GW) 56 is a user-plane packet-transfer node that is placed in a core network (EPC) of the EPS and transfers user data packets of the UE 3. The P-GW 56 serves as a gateway to an external Packet Data Network (PDN) and provides the UE 3 with connectivity to the external PDN. The external PDN includes the SCS 2 and the MTC application server 4, for example. Further, the P-GW 56 has a Charging Trigger Function (CTF), a Charging Data Function (CDF), and a Policy and Charging Enforcement Function (PCEF). The P-GW 56 serving as the PCEF performs Quality of Service (QoS) control and Flow based Bearer Charging (FBC) per service data flow (i.e., IP packet flow) of the UE 3 in accordance with a Policy and Charging Control (PCC) rule supplied from the PCRF entity 5. The FBC is implemented by the CTF, the CDF, and the PCEF of the P-GW 56.

In other words, the P-GW 56 differentiates a plurality of service data flows sent or received by the UE 3 using an SDF template or a Traffic Flow Template (TFT) and maps each service data flow to an EPS bearer (IP Connectivity Access Network (IP-CAN) bearer) corresponding to the QoS of the service data flow. Further, the P-GW 56 monitors a service data flow as a chargeable event that triggers the generation and close of a Charging Data Record (CDR), counts the number of packets in the service data flow, and generates the CDR containing the charging information related to the service data flow. Note that the chargeable event is an activity that uses resources or services served by a communication network. The chargeable event is, for example, user to user communication (e.g., a single call, a data communication session or a short message), user to network communication (e.g., service profile administration)), inter-network communication (e.g., transferring calls, signaling, or short messages), or mobility (e.g., roaming or inter-system handover). The CDR is formatted charging information (e.g., a call time, a data transfer amount etc.).

A Traffic Detection Function (TDF) entity 57 has a deep packet inspection (DPI) function. The TDF entity 57 receives an Application Detection and Control (ADC) rule from the PCRF entity 5 through a Sd reference point, performs deep packet inspection on user packets in accordance with the ADC rule, and detects an application traffic (e.g., streaming video service, VoIP service, P2P file sharing service, specific HTTP traffic) specified by the ADC rule. Then, the TDF entity 57 reports to the PCRF entity 5 the detection result of the application traffic through the Sd reference point. The function of the TDF entity 57 may collocate with a PCEF. In other words, the TDF entity 57 may be placed in the P-GW 56. In still other words, the P-GW 56 may have a PCEF enhanced with ADC.

Hereinafter, control of service quality of a specific communication of the UE 3 is described. In the example of FIG. 1, the MTC-IWF entity 1 has a signaling interface (reference point) 11 with the PCRF entity 5. In response to receiving a first QoS request from the SCS 2 through a Tsp reference point, the MTC-IWF entity 1 sends a second QoS request to the PCRF entity 5 through the signaling interface 11.

The first QoS request, which is sent from the SCS 2 to the MTC-IWF entity 1, requests quality of service to be applied to a specific communication of the UE 3 as an MTC device. The specific communication of the UE 3 may be communication with a specific system, communication on a specific protocol, or traffic of a specific application. In other words, the specific communication of the UE 3 may be specified by any one or combination of identification information on Layer 3-7 of the OSI reference model.

In order to specify the quality of service, the first QoS request may indicate at least one of a QoS Class Identifier (QCI), an Allocation and Retention Priority (ARP), a Maximum Bit Rate (MBR), Guaranteed Bit Rate (GBR), and a priority level (e.g., high priority, medium priority, and low priority). Further, the first QoS request may contain an application name (e.g., YouTube (registered trademark), Skype (registered trademark)) in order to specify the specific communication of the UE 3. Further, the first QoS request may contain at least one of a source address, a destination address, a port number, and a protocol identifier for identifying a packet flow of the specific communication of the UE 3. Furthermore, the first QoS request may indicate intended use (e.g., background communication, automatic software update, automatic meter reading) of the specific communication.

The first QoS request may contain an external identifier (external ID) associated with the UE 3 in order to specify the target UE 3. The external ID is used to identify the UE 3 outside the PLMN containing the SCS 2 and the MTC application server 4. The external ID may be, for example, a Mobile Subscriber ISDN Number (MSISDN).

The first QoS request may contain an identifier of the SCS 2 in order to indicate the sender SCS 2. Further, the first QoS request may contain a transaction identifier (e.g., sequence number) in order to distinguish among a plurality of first QoS requests sent from the SCS 2.

The second QoS request, which is sent from the MTC-IWF entity 1 to the PCRF entity 5, may indicate information similar to the information contained in the first QoS request in order to specify the quality of service. Specifically, the second QoS request may indicate at least one of a QCI, an ARP, a MBR, a GBR, and a priority level. Further, the second QoS request may contain at least one of a source address, a destination address, a port number, and a protocol identifier for identifying a packet flow of the specific communication of the UE 3. Furthermore, the second QoS request may indicate intended use of the specific communication.

The second QoS request may contain an internal identifier (internal ID) associated with the UE 3 in order to specify the target UE 3. The internal ID is used to identify the UE 3 inside the PLMN. The internal ID may be, for example, an International Mobile Subscriber Identity (IMSI). The MTC-IWF entity 1 may obtain the internal ID of the UE 3 by asking the HSS 51 about the internal ID corresponding to the external ID of the UE 3.

In the case where a plurality of PCRF entities 5 are placed in the PLMN, the MTC-IWF entity 1 needs to select the PCRF entity 5 that manages service flows of the UE 3 from the plurality of PCRF entities 5. Thus, the MTC-IWF entity 5 may exchange control messages with the DRA 52 and thereby obtaining an address of an appropriate PCRF entity 5 from the DRA 52.

The PCRF entity 5 performs the control for applying the quality of service requested by the second QoS request to the specific communication of the UE 3 in response to receiving the second QoS request from the MTC-IWF entity 1. In order to apply the quality of service requested by the second QoS request to the specific communication of the UE 3, the PCRF entity 5 may control at least one of the P-GW 56 serving as a PCEF and the entity 57 serving as a TDF.

To be specific, the PCRF entity 5 may generate a PCC rule based on the quality of service indicated by the second QoS request, the identifier of the UE 3, and the identification information (e.g., an application name, a source address, a port number, or a protocol identifier, or any combination of those) of the specific communication and provide the generated PCC rule to the P-GW 56. The provision of the PCC rule to the P-GW 56 triggers the modification of an IP-CAN session regarding the UE 3. For example, the modification of the IP-CAN session includes updating of the QoS of the IP-CAN bearer (EPS bearer) that has already been set up, or includes updating of the SDF template or the Traffic Flow Template (TFT). Further, when the QoS policy to be applied to the service data flow (IP packet flow) of the specific communication of the UE 3 is different from the QoS policy of the EPS bearer that has already been set up, the modification of the IP-CAN bearer may include generation of a new dedicated EPS bearer for transferring the service data flow of the specific communication of the UE 3.

Further, the PCRF entity 5 may generate an ADC rule based on the identification information (e.g., application name) of the specific communication indicated by the second QoS request and provide the generated PCC rule to the TDF entity 57. Then, in response to detection of a packet flow of the specific communication from user traffic sent or received by the UE 3 through the EPS bearer that has already been set up, the PCRF entity 5 may generate a PCC rule to be applied to the packet flow of the specific communication. For example, when the specific communication of the UE 3 is specified by information on Layers 5-7 (e.g., application name) of the OSI reference model in the second QoS request, the PCRF entity 5 cannot generate a sufficient PCC rule only from the information contained in the second QoS request in some cases. This is because information about Layers 3 and 4 required for a PCC rule (to be specific, SDF template or TFT) such as an IP address of a node with which the UE 3 communicates is not known. Accordingly, the PCRF entity 5 may detect traffic of the specific communication (i.e., traffic of the specific application) from the user data flow of the UE 3 by means of the deep packet inspection (DPI) function in the TDF entity 57. The PCRF entity 5 thus obtains information required for determining a PCC rule, which is information on Layers 3 and 4 such as an IP address of a node with which the UE 3 communicates and a port number.

Figure 2:
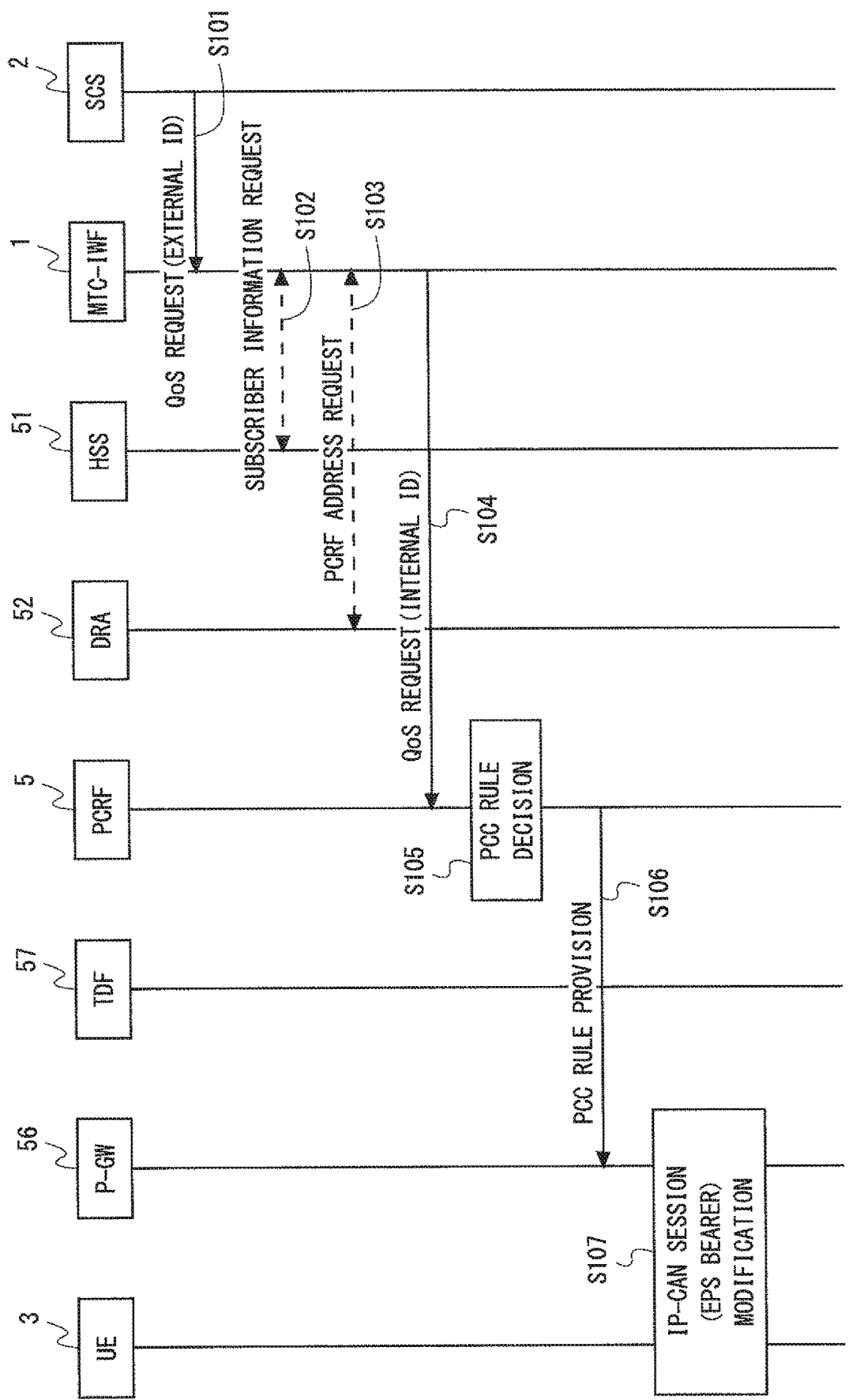
FIG. 2 is a sequence diagram showing one example of control of quality of service according to the first embodiment.

FIG. 2 is a sequence diagram showing one example of Quality of Service control (QoS control) for the UE 3 based on a request from the SCS 2. In Step S101, the SCS 2 sends a first QoS request to the MTC-IWF entity 1 through the Tsp reference point. The first QoS request contains an external ID of the UE 3 for identifying the UE 3, for which the control is to be performed. Further, the first QoS request contains information for identifying a specific communication of the UE 3, which includes, for example, an application name, a port number, or an IP address of a node with which the UE 3 communicates, or any combination of those. Furthermore, the first QoS request indicates information for identifying the required quality of service, which includes, for example, a QCI, an ARP, a MBR, a GBR, or a priority level, or any combination of those.

In Step S102, in response to receiving the first QoS request from the SCS 2, the MTC-IWF entity 1 asks the HSS 1 about an internal ID corresponding to the external ID of the UE 3 indicated by the first QoS request. The MTC-IWF entity 1 may request the HSS 51 to send subscriber information corresponding to the external ID of the UE 3. Note that, when the MTC-IWF entity 1 already knows the internal ID of the UE 3, Step S102 can be skipped.

In Step S103, the MTC-IWF entity 1 asks the DRA 52 about a PCRF entity 5 that manages the IP-CAN session of the UE 3. The MTC-IWF entity 1 may request the DRA 52 to send an address of the PCRF entity 5 that manages the IP-CAN session of the UE 3. Note that, when there is only one PCRF entity 5 placed in the PLMN or the MTC-IWF entity 1 already knows the PCRF entity 5 that manages the UE 3 as an MTC device, Step S103 can be skipped.

In Step S104, the MTC-IWF entity 1 sends a second QoS request to the PCRF entity 5 through the signaling interface 11. In the example of FIG. 2, the second QoS request contains the internal ID of the UE 3 for identifying the UE 3, for which control is to be performed. Further, the second QoS request contains information for identifying the specific communication of the UE 3, which includes, for example, an application name, a port number, or an IP address of a node with which the UE3 communicates, or any combination of those. Furthermore, the second QoS request indicates information for identifying the required quality of service, which includes, for example, a QCI, an ARP, a MBR, a GBR, or a priority level, or any combination of those.

In Step S105, in response to receiving the second QoS request from the MTC-IWF entity 1, the PCRF entity 5 determines a PCC rule to be applied to the specific communication of the UE 3. This PCC rule contains an SDF template (i.e., packet filter) for identifying a packet flow related to the specific communication of the UE 3 and also contains information for QoS control (e.g., QCI, ARP, MBR, GBR). Further, the PCC rule may contain information for charging control (e.g., Charging key, Charging method, Measurement method) on the specific communication of the UE 3. In Step S106, the PCRF entity 5 sends the determined PCC rule to the P-GW 56 (PCEF) in order to enforce the determined PCC rule on the specific communication of the UE 3.

In Step S107, the P-GW 56 serving as a PCEF receives the PCC rule and then applies it to the communication of the UE 3. To be specific, the P-GW 56 initiates an IP-CAN Session Modification procedure in response to receiving the PCC rule. As described earlier, the modification of the IP-CAN session may include updating of the QoS of the IP-CAN bearer (EPS bearer) that has already been set up, or include updating of the SDF template or the Traffic Flow Template (TFT), for example. Further, when the QoS policy to be applied to the service data flow (IP packet flow) related to the specific communication of the UE 3 is different from the QoS policy of the EPS bearer that has already been set up, the modification of the IP-CAN bearer may include generation of a new dedicated EPS bearer for transferring the service data flow of the specific communication of the UE 3.

As is understood from the above description, in this embodiment, the MTC-IWF entity 1 and the PCRF entity 5 operate to adjust quality of service (QoS) of a specific communication (e.g., specific application traffic) of the UE 3 based on a request by the SCS 2 for the quality of service (QoS). Thus, according to this embodiment, it is possible to facilitate controlling the quality of service of the specific communication of the UE 3 in the PLMN in response to the request by the SCS 2 for the quality of service.

Second Embodiment

In this embodiment, another specific example of Quality of Service control (QoS control) for the UE 3 based on a request from the SCS 2 is described. A configuration example of the wireless communication system according to this embodiment is the same as the one shown in FIG. 1.

Figure 3:
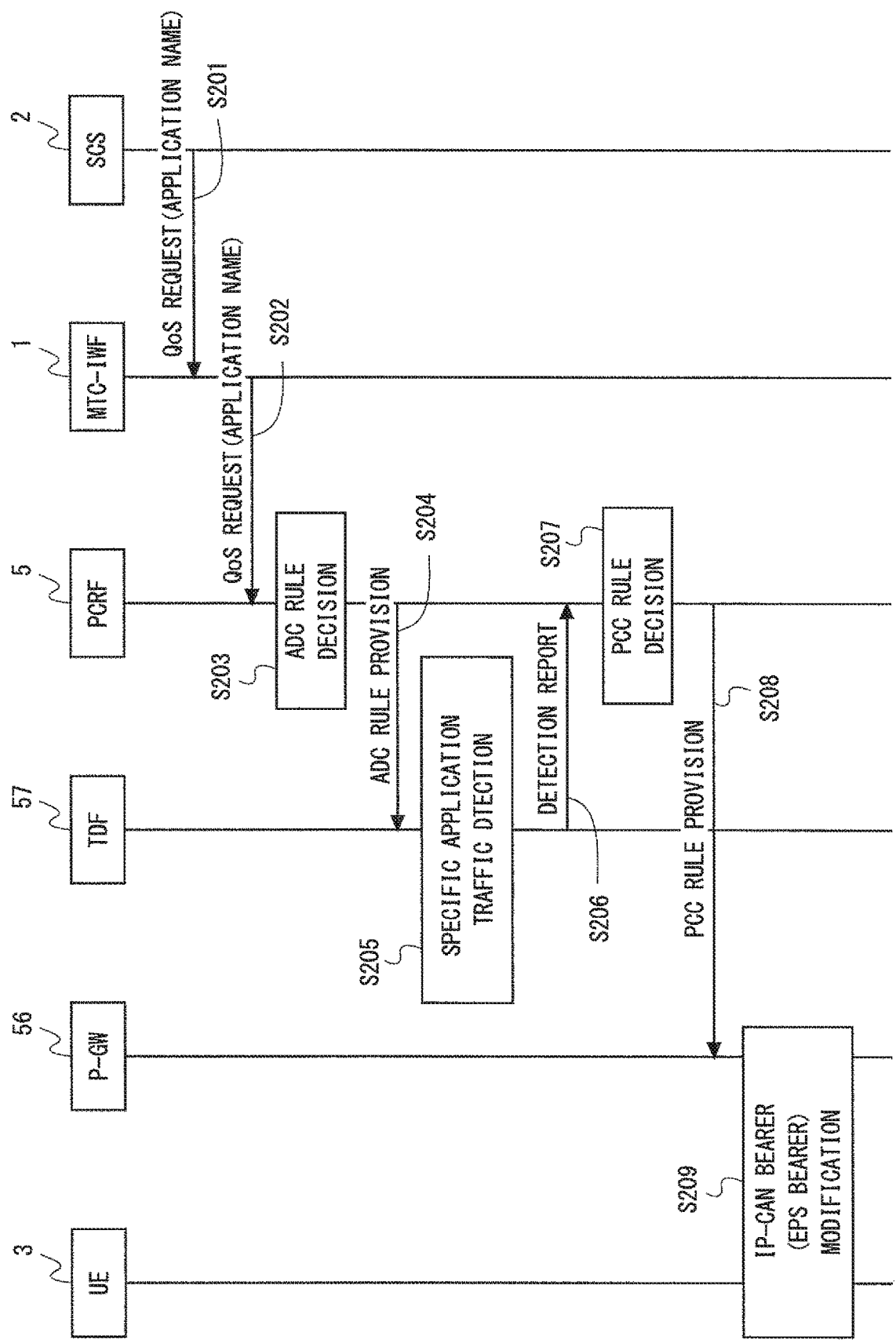
FIG. 3 is a sequence diagram showing one example of control of quality of service according to the second embodiment.

FIG. 3 is a sequence diagram showing one example of Quality of Service control (QoS control) for the UE 3 based on a request from the SCS 2. In the example of FIG. 3, the first QoS request, which is sent from the SCS 2, and the second QoS request, which is sent from the MTC-IWF entity 1, identify a specific communication of the UE 3 by means of information on Layers 5-7 (e.g., application name) of the OSI reference model. Accordingly, in order to detect traffic of the specific communication (i.e., traffic of a specific application) from the user data flow of the UE 3, the PCRF entity 5 uses the deep packet inspection (DPI) function in the TDF entity 57. The PCRF entity 5 thus obtains information required for determining a PCC rule, which is information on Layers 3 and 4 (e.g., an IP address of a node with which the UE 3 communicates and a port number) related to the specific communication of the UE 3.

In Step S201, the SCS 2 sends a first QoS request to the MTC-IWF entity 1 through the Tsp reference point. The first QoS request contains information on Layers 5-7 (e.g., application name) for identifying a specific communication of the UE 3. Further, like the one described above with respect to FIG. 2, the first QoS request may contain an external ID of the UE 3 and information for identifying the required quality of service (e.g., QCI, ARP, MBR, GBR or priority level).

In Step S202, the MTC-IWF entity 1 sends a second QoS request to the PCRF entity 5 through the signaling interface 11. The second QoS request contains information on Layers 5-7 (e.g., application name) for identifying the specific communication of the UE 3. Further, as the one described above with respect to FIG. 2, the second QoS request may contain an internal ID of the UE 3 and information for identifying the required quality of service (e.g., QCI, ARP, MBR, GBR or priority level). Further, prior to Step S202, an inquiry to the HSS 51 and an inquiry to the DRA 52 (Steps S102 and S103 in FIG. 2) may be made.

In Step S203, in response to receiving the second QoS request, the PCRF entity 5 determines an ADC rule to be used for detecting traffic of the specific communication (i.e., traffic of a specific application) from the user data flow of the UE 3. This ADC rule contains an identifier (e.g., IP address) of the target UE 3 and an identifier (e.g., application name) of an application to be detected. In Step S204, the PCRF entity 5 provides the determined ADC rule to the TDF entity 57.

In Step S205, the TDF entity 57 starts DPI on the user data flow of the UE 3 in order to detect specific application traffic in accordance with the received ADC rule. Then, in Step S206, in response to detection of the specific application traffic, the TDF entity 57 sends a detection report to the PCRF entity 5. The detection report contains information on Layers 3 and 4 (e.g., an IP address of a node with which the UE 3 communicates and a port number) related to the specific application traffic.

In Step S207, the PCRF entity 5 determines a PCC rule to be applied to the specific communication of the UE 3 based on the detection report from the TDF entity 57. This PCC rule contains an SDF template (i.e., packet filter) for identifying a packet flow related to the specific communication of the UE 3 and information for QoS control (e.g., QCI, ARP, MBR, GBR). Further, the PCC rule may contain information for charging control (e.g., Charging key, Charging method, Measurement method) on the specific communication of the UE 3. In Step S208, the PCRF entity 5 sends the determined PCC rule to the P-GW 56 (PCEF) in order to enforce the determined PCC rule on the specific communication of the UE 3.

In Step S209 the P-GW 56 serving as a PCEF receives the PCC rule and applies it to the communication of the UE 3.

To be specific, the P-GW 56 initiates an IP-CAN Session Modification procedure in response to receiving the PCC rule.

Figure 4:
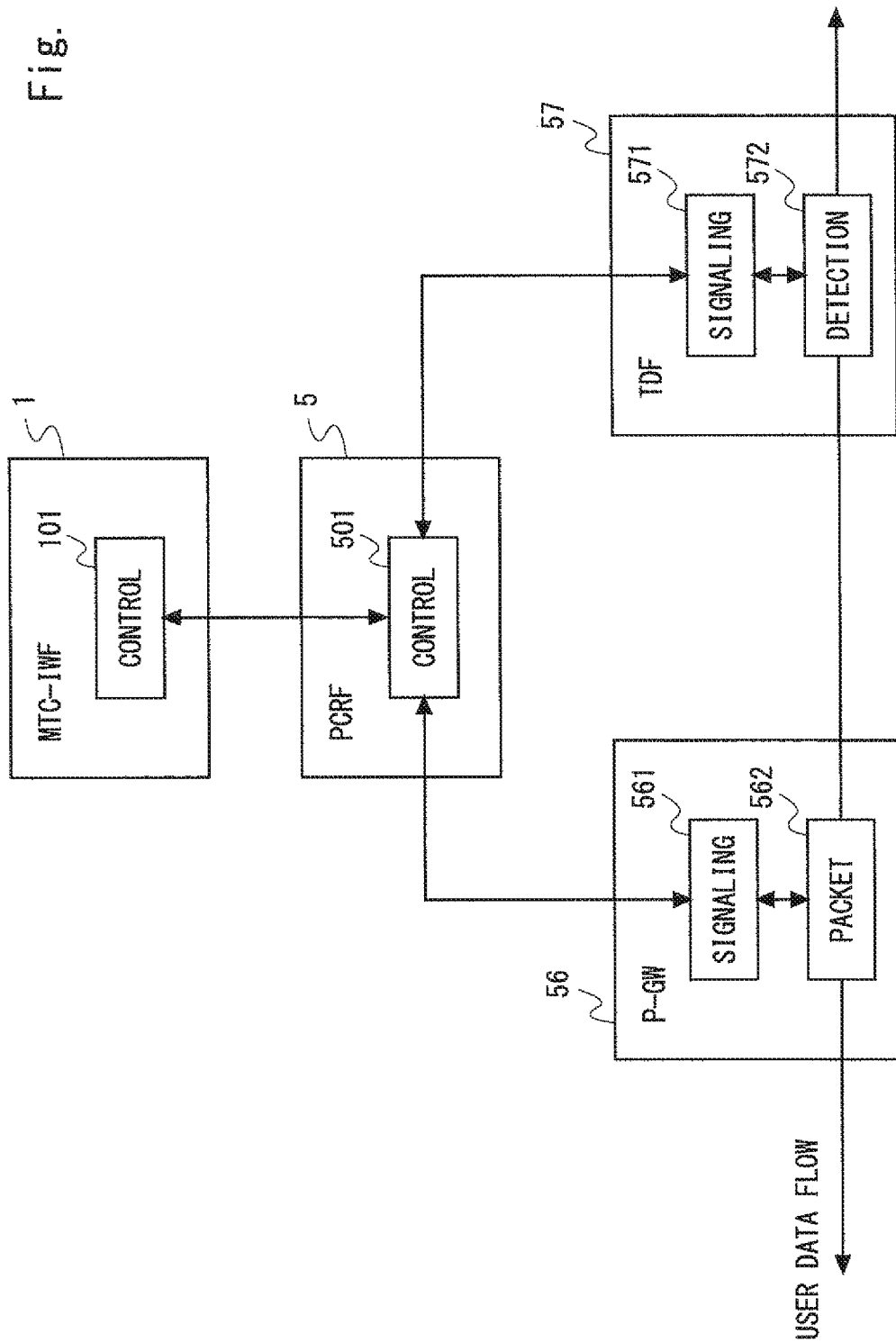
FIG. 4 is a block diagram showing a configuration example of several entities or nodes according to the second embodiment.

FIG. 4 is a block diagram showing a configuration example of the MTC-IWF entity 1, the PCRF entity 5, the P-GW 56, and the TDF entity 57 according to this embodiment. In the example of FIG. 4, the MTC-IWF entity 1 includes a control unit 101. The control unit 101 is configured to send the second QoS request to the PCRF entity 5 in response to receiving the first QoS request from the SCS 2.

In the example of FIG. 4, the PCRF entity 5 includes a control unit 501. The control unit 501 is configured to, in response to receiving the second QoS request, determine an ADC rule for detecting specific application traffic of the UE 3 and provide the determined ADC rule to the TDF entity 57. The control unit 501 is further configured to receive a detection report related to the specific application traffic of the UE 3 from the TDF entity 57, determine a PCC rule to be applied to the specific application traffic of the UE 3, and provide the determined PCC rule to the P-GW 56.

In the example of FIG. 4, the TDF entity 57 includes a signaling unit 571 and a detection unit 572. The signaling unit 571 is configured to receive an ADC rule from the PCRF entity 5 (control unit 501) and send a detection report related to the application traffic detected based on the ADC rule. The detection unit 572 is configured to perform DPI on the user data traffic of the UE 3 in order to detect the application traffic specified by the ADC rule.

In the example of FIG. 4, the P-GW 56 includes a signaling unit 561 and a packet processing unit 562. The signaling unit 561 is configured to receive a PCC rule from the PCRF entity 5 (control unit 501). The packet processing unit 562 is configured to apply the service data flow and the QoS policy specified by the PCC rule to the IP-CAN bearer (EPS bearer). Specifically, the packet processing unit 562 is configured to modify the QoS policy of the dedicated bearer with the UE 3, modify the SDF template and the TFT applied to the dedicated bearer for the UE 3, or set up a new dedicated EPS bearer for the UE 3.

According to this embodiment, the SCS 2 can specify the specific communication of the UE 3, to which the QoS request is targeted, by information on Layers 5-7 of the OSI reference model in the first QoS request. For example, the specific communication of the UE 3, to which the QoS request is targeted, may be specified by an application name (e.g., YouTube (registered trademark), Skype (registered trademark)) in the first QoS request. In another example, the specific communication of the UE 3 may be specified by its intended use (e.g., background communication, automatic software update, automatic meter reading) in the first QoS request. Thus, when the SCS 2 sends a QoS request to the PLMN (MTC-IWF entity 1), it is possible to flexibly specify the specific communication of the UE 3, to which the QoS request is targeted, by using information of the upper layer (Layers 5-7).

Another Embodiment 1

In the case where a plurality of HSSs 51 are placed in the PLMN, the MTC-IWF entity 1 may perform HSS search to identify the HSS 51 to which an inquiry about the internal ID of the UE 3 is to be made. In one example, the MTC-IWF entity 1 may be preset with an address of the HSS 51 that manages subscriber information of the UE 3 as an MTC device. In another example, the MTC-IWF entity 1 may use a Subscription Locator Function (SLF) or a Diameter Routing Agent (DRA).

In the above-described second embodiment, an example of applying a PCC rule based on a QoS request specifying an application by means of information on Layers 5-7 is described. Specifically, the PCRF entity 5 according to the second embodiment uses DPI in the TDF in response to the QoS request specifying an application by information on Layers 5-7, and thereby obtaining information on Layers 3 and 4 required for deciding a PCC rule (SDF template). This operation of the PCRF entity 5 may be performed for a QoS request from another node or entity (e.g., Application Function) which is different from the SCS 2 and the MTC-IWF entity 1. Thus, when the node or entity (e.g., Application Function) makes a QoS request to the PCRF entity 5, it is possible to flexibly specify a specific communication of the UE 3, to which the QoS request is targeted, by using information of the upper layer (Layers 5-7).

In the above-described second embodiment, an example in which the TDF entity 57 detects application traffic is described. However, it may cause an increase in processing load of the TDF entity 57 to always perform the DPI for detecting application traffic. Thus, the PCRF entity 5 may notify the PCRF entity 57 of a period for which the DPI is to be performed, which is a period for which the ADC rule is to be enforced, together with the ADC rule. Further, the period for which the DPI is to be performed (period for which the ADC rule is to be enforced) may be specified by the first QoS request, which is sent from the SCS 2 to the MTC-IWF entity 1, and the second QoS request, which is sent from the MTC-IWF entity 1 to the PCRF entity 5. In other words, the first and second QoS requests may specify a period for which a special QoS policy is to be applied to a specific communication of the UE 3. Thus, the SCS 2 can apply a special QoS policy for a desired period (time), and the load on the TDF entity 57 can be reduced.

The operations of the MTC-IWF entity 1, the SCS 2, the UE 3, the PCRF entity 5, the S-GW 55, the P-GW 56, the TDF entity 57, and the like described in the first and second embodiments may be implemented by causing a computer system including at least one processor (e.g., microprocessor, Micro Processing Unit (MPU), Central Processing Unit (CPU)) to execute a program. To be specific, one or more programs containing instructions that cause a computer to perform algorithms described using FIGS. 2, 3 and the like the may be supplied to the computer.

These programs can be stored and provided to the computer using any type of non-transitory computer readable medium. The non-transitory computer readable medium includes any type of tangible storage medium. Examples of the non-transitory computer readable medium include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable medium. Examples of the transitory computer readable medium include electric signals, optical signals, and electromagnetic waves. The transitory computer readable medium can provide the programs to a computer via a wired communication line (e.g., electric wires, and optical fibers) or a wireless communication line.

Another Embodiment 2

A novel embodiment which is different from the above-described first and second embodiments is described hereinafter. The novel embodiment described hereinafter can be implemented independently of the above-described first and second embodiments and able to solve a different problem from those of the first and second embodiments.

Figure 5:
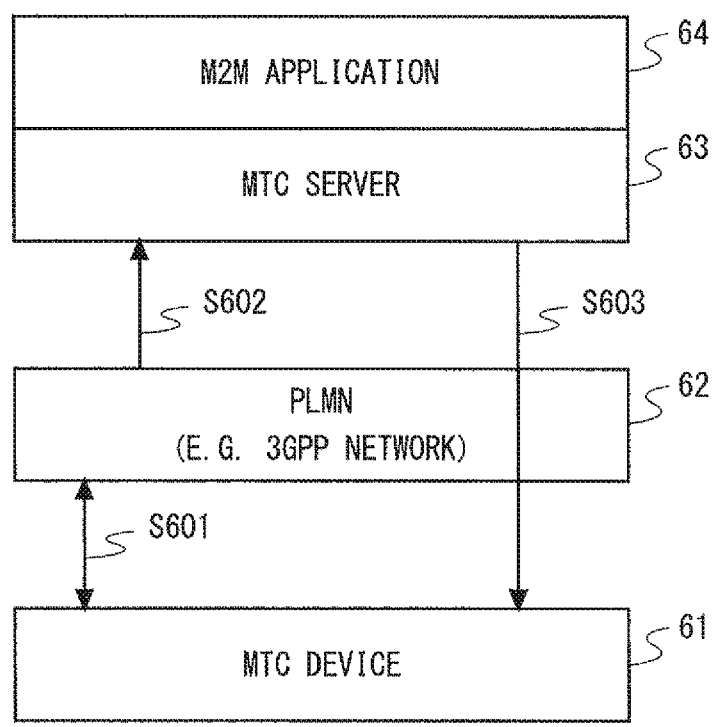
FIG. 5 is a diagram showing a wireless communication system according to another embodiment 2.

FIG. 5 is a diagram showing a configuration example of a wireless communication system according to this embodiment. An MTC device 61 can connect to a PLMN 62 and can communicate with an MTC server 63 through the PLMN 62. The MTC device 61 can be also referred to as a UE that executes an MTC UE application. The MTC device 61 may be an MTC gateway device.

A Public Land Mobile Network (PLMN) 62 is a 3GPP network, i.e., a Universal Mobile Telecommunications System (UMTS) or an Evolved Packet System (EPS), for example. The PLMN 62 includes a Radio Access Network (RAN) and a core network. To be more specific, the PLMN 62 includes a base station as a RAN node, a mobility management node as a control-plane entity of the core network (e.g., an MME or a control plane function of an SGSN), and a data transfer node as a user-plane entity of the core network (e.g., a P-GW, an S-GW, a GGSN, or a user plane function of an SGSN). Further, the PLMN 62 may include a Machine Type Communication Inter Working Function (MTC-IWF) that allows an M2M service layer containing an MTC server 63 to interwork with the PLMN 62.

The MTC server 63 connects an M2M application 64 to the PLMN 62 and allows the M2M application 64 to communicate with the MTC device 61 through services served by the PLMN 62. The MTC server 63 is also referred to as a Service Capability Server (SCS) or an M2M server.

The M2M application 64 is placed outside the PLMN 62 (i.e., placed in an external network), executes an M2M application (MTC application), and communicates with an MTC UE application implemented in the MTC device 61. The M2M application 64 is generally controlled by an M2M service provider (MTC service provider). The M2M application 64 is also referred to as an M2M application server or an MTC application server.

The operation of the MTC device 61, the PLMN 62, and the MTC server 63 according to this embodiment is described in further detail below. In response to an attach of the MTC device 61 to the PLMN 62 (Step S601), the PLMN 62 operates to notify the MTC server 63 of the attach of the MTC device 61 to the PLMN 62 (Step S602). Note that, an attach of the MTC device 61 to the PLMN 62 means that mobility management of the MTC device 61 is started in the PLMN 62. For example, in the example of the EPS, the MTC device 61 is registered in the MME of the PLMN 62 and transitions from the EPS Mobility Management (EMM)-DEREGISTERED state to the EMM-REGISTERED state. In other words, after the MTC device 61 has attached to the PLMN 62, the PLMN 62 can reach the MTC device 61 by paging. Thus, stated differently, the PLMN 62 notifies the MTC server 63 that the MTC device 61 can be reached by paging.

The MTC server 63 receives an attach notification (S602) of the MTC device 61 from the PLMN 62 and recognizes that it can now communicate with the MTC device 61. Accordingly, the MTC server 63 may start communicating with the MTC device 61 (Step S603).

The operations in Steps S601 to S603 is particularly effective in the case where the MTC server 63 cannot accurately recognize the period when it can communicate with the MTC device 61 through the PLMN 62. One example is the case where the MTC device 61 stops the operation of a communication module in most times in order to reduce power consumption. In this case, the MTC device 61 may have a wake/sleep schedule that is set by the MTC server 63. The wake/sleep schedule defines a wake period and a sleep period. During the wake period, the MTC device 61 has attached to the PLMN 62 and can communicate with the MTC server 63 through the PLMN 62. During the sleep period, the MTC device 61 has detached from the PLMN 62 and cannot respond to paging from the PLMN 6, and thus the MTC server 63 cannot communicate with the MTC device 61.

The MTC device 61 may communicate with the PLMN 62 even during the sleep period in response to a certain trigger event. However, the MTC server 63 cannot know the fact that the MTC device 61 has attached to the PLMN 62 (i.e., it can start communication with the MTC device 61) except for the predetermined wake period. Further, there can be a case where the MTC device 61 does not attach to the PLMN 62 even during the wake period when there is no data to be sent or when specified conditions for transmission are not satisfied. Furthermore, there is a possibility that an internal clock in the MTC device 61 is not accurate enough, and accordingly the wake/sleep schedule of the MTC device 61 is not synchronous with the wake/sleep schedule of the MTC server 63. In those cases, the MTC server 63 cannot accurately know the fact that the MTC device 61 has attached to the PLMN 62 (i.e., it can start communication with the MTC device 61).

Therefore, as described above, by informing the MTC server 63 that the MTC device 61 has attached to the PLMN 62 (i.e., communication with the MTC device 61 can be started), the PLMN 62 can increase the opportunities for the MTC server 63 to communicate with the MTC device 61.

This embodiment can be applied effectively to, for example, the case where the MTC device 61 is coupled to a water gauge of a river and reports a measured water level to the MTC server 63 or the M2M application 64. A short wake period (e.g., 1 minute) and a long sleep period (e.g., 6 hours) may be set to the MTC device 61 by the MTC server 63. Further, the MTC device 61 may report a new measurement result only when a measured water level exceeds a specified threshold. The MTC device 61 may not report any measurement result for a long time (e.g., several months) as long as the water level is normal.

However, when one or more measurement results have been reported from one or several water gauges (MTC devices 61) and the measurement result(s) indicates a value that alarms the occurrence of a flood, it is preferred to immediately and frequently obtain measurement results of other water gauges (MTC devices 61) to more specifically recognize the current situation. In this case, it is preferred to update the wake/sleep schedule of all the relevant MTC devices 61 (e.g., MTC devices 61 installed in the same river) immediately. According to the operation in Steps S601 to S603 described above, the MTC server 62 can accurately recognize that it is possible to start communication with the MTC device 61 (i.e., mobile terminated communication), and thus the MTC server 62 can immediately send a new wake/sleep schedule also to the MTC device 62 from which no measurement result is reported.

Figure 6:
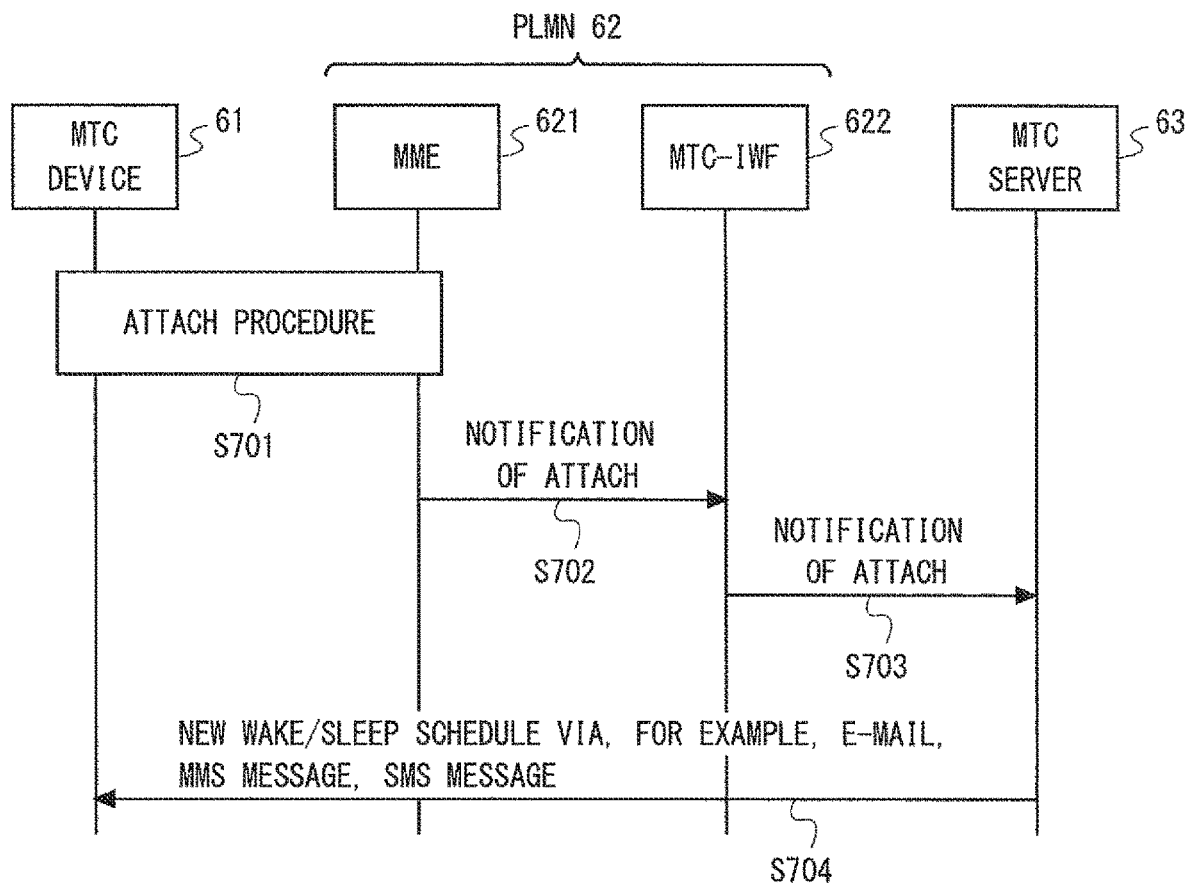
FIG. 6 is a sequence diagram showing one example of an operation according to another embodiment 2.

FIG. 6 is a sequence diagram showing a specific example of the operation in Steps S601 to S603 described with reference to FIG. 5. In the example of FIG. 6, the PLMN 62 includes an MME 621 and an MTC-IWF entity 622. In Step S701, the MTC device 61 sends an ATTACH REQUEST to the MME 621 and initiates an attach procedure with the MME 621. In Step S702, the MME 621 sends to the MTC-IWF entity 622 a notification indicating the attach of the MTC device 61 to the PLMN 62. In Step S702, in response to the notification from the MME 621, the MTC-IWF entity 622 sends to the MTC server 63 a notification indicating the attach of the MTC device 61 to the PLMN 62. In Step S704, the MTC server 62 sends a new wake/sleep schedule to the MTC device 61 through the PLMN 62. The new wake/sleep schedule may be sent via an E-mail, a Short Message Service (SMS) message, or a Multimedia Messaging Service (MMS), for example.

Further, the above-described embodiments are merely an exemplification of application of the technical ideas obtained by the present inventor. The technical ideas are not limited to the above-described embodiments, and various changes and modifications may be made as a matter of course.

For example, the whole or part of the embodiments disclosed above can be described as, but not limited to, the following supplementary notes.

(Supplementary Note 1)

A Policy and Charging Rules Function (PCRF) entity, including:

a control unit configured to, in response to detection of a specific packet flow from user traffic sent or received by a mobile station through a bearer already set up, provides, to a PCRF node having a Policy and Charging Enforcement Function (PCEF), a first Policy and Charging Control (PCC) rule to be applied to the specific packet flow.

(Supplementary Note 2)

The PCRF entity according to Supplementary note 1, in which the first PCC rule is different from a second PCC rule to be applied to the user traffic.

(Supplementary Note 3)

The PCRF entity according to Supplementary note 1 or 2, in which the provision of the first PCC rule to the PCEF node triggers generation of a new dedicated bearer for transferring the specific packet flow.

(Supplementary Note 4)

The PCRF entity according to any one of Supplementary notes 1 to 3, in which the control unit provides, to a TDF node having a Traffic Detection Function (TDF), an Application Detection and Control (ADC) rule for detecting the specific packet flow, and the control unit provides the first PCC rule to the PCEF node in response to detection of the specific packet flow by the TDF node.

(Supplementary Note 5)

The PCRF entity according to Supplementary note 4, in which the ADC rule contains an application name specifying the specific packet flow, and the first PCC rule indicates at least one of a source address, a destination address, a port number, and a protocol identifier, which have been detected by the TDF node for the specific packet flow based on the application name.

(Supplementary Note 6)

The PCRF entity according to any one of Supplementary notes 1 to 3, in which the mobile station is a Machine Type Communication (MTC) device, and the control unit provides the first PCC rule to the PCEF node in response to receiving from a Machine Type Communication Inter Working Function (MTC-IWF) entity a request for quality of service to be applied to a specific communication of the MTC device.

(Supplementary Note 7)

The PCRF entity according to Supplementary note 4 or 5, in which the mobile station is a Machine Type Communication (MTC) device, and the control unit provides the ADC rule to the TDF node in response to receiving from a Machine Type Communication Inter Working Function (MTC-IWF) entity a request for quality of service to be applied to a specific communication of the MTC device.

(Supplementary Note 8)

The PCRF entity according to Supplementary note 4, 5 or 7, in which the control unit notifies the TDF node of a period when the ADC rule is to be enforced.

(Supplementary Note 9)

The PCRF entity according to Supplementary note 7, in which the request contains designation of a period when quality of service is to be applied to the specific communication, and the control unit notifies the TDF node of the period when the ADC rule is to be enforced, which is determined based on the period when the quality of service is to be applied.

(Supplementary Note 10)

A control method performed by a Policy and Charging Rules Function (PCRF) entity, the control method including:

in response to detection of a specific packet flow from user traffic sent or received by a mobile station through a bearer already set up, providing, to a PCRF node having a Policy and Charging Enforcement Function (PCEF), a first Policy and Charging Control (PCC) rule to be applied to the specific packet flow.

(Supplementary Note 11)

The control method according to Supplementary note 10, in which the first PCC rule is different from a second PCC rule to be applied to the user traffic.

(Supplementary Note 12)

The control method according to Supplementary note 10 or 11, in which the provision of the first PCC rule to the PCEF node triggers generation of a new dedicated bearer for transferring the specific packet flow.

(Supplementary Note 13)

The control method according to any one of Supplementary notes 10 to 12, in which the providing includes sending, to a TDF node having a Traffic Detection Function (TDF), an Application Detection and Control (ADC) rule for detecting the specific packet flow, and providing the first PCC rule to the PCEF node in response to detection of the specific packet flow by the TDF node.

(Supplementary Note 14)

The control method according to Supplementary note 13, in which the ADC rule contains an application name specifying the specific packet flow, and the first PCC rule indicates at least one of a source address, a destination address, a port number, and a protocol identifier, which have been detected by the TDF node for the specific packet flow based on the application name.

(Supplementary Note 15)

The control method according to any one of Supplementary notes 10 to 12, in which the mobile station is a Machine Type Communication (MTC) device, and the providing includes providing the first PCC rule to the PCEF node in response to receiving from a Machine Type Communication Inter Working Function (MTC-IWF) entity a request for quality of service to be applied to a specific communication of the MTC device.

(Supplementary Note 16)

The control method according to Supplementary note 13 or 14, in which the mobile station is a Machine Type Communication (MTC) device, and the sending includes sending the ADC rule to the TDF node in response to receiving from a Machine Type Communication Inter Working Function (MTC-IWF) entity a request for quality of service to be applied to a specific communication of the MTC device.

(Supplementary Note 17)

A program for causing a computer to perform a control method related to a Policy and Charging Rules Function (PCRF), in which the control method includes:

in response to detection of a specific packet flow from user traffic sent or received by a mobile station through a bearer already set up, providing, to a PCRF node having a Policy and Charging Enforcement Function (PCEF), a first Policy and Charging Control (PCC) rule to be applied to the specific packet flow.

(Supplementary Note 18)

A network node placed in a Public Land Mobile Network (PLMN), including:

a control unit configured to, in response to an attach of a Machine Type Communication (MTC) device to the PLMN, sends, to an MTC server placed outside the PLMN, a notification indicating that a communication with the MTC device is possible.

(Supplementary Note 19)

The network node according to Supplementary note 18, in which the network node is a Machine Type Communication Inter Working Function (MTC-IWF) entity.

(Supplementary Note 20)

A method performed by a network node placed in a Public Land Mobile Network (PLMN), including:

in response to an attach of a Machine Type Communication (MTC) device to the PLMN, sending, to an MTC server placed outside the PLMN, a notification indicating that a communication with the MTC device is possible.

(Supplementary Note 21)

The method according to Supplementary note 20, in which the network node is a Machine Type Communication Inter Working Function (MTC-IWF) entity.

This application is based upon and claims the benefit of priority from Japanese patent application No. 2014-002755, filed on Jan. 9, 2014, the disclosure of which is incorporated herein in its entirety by reference.

REFERENCE SIGNS LIST

1 MACHINE TYPE COMMUNICATION INTER WORKING FUNCTION (MTC-IWF) ENTITY
2 SERVICE CAPABILITY SERVER (SCS)
3 USER EQUIPMENT (UE)
4 MTC APPLICATION SERVER
11, 12 SIGNALING INTERFACE (OR REFERENCE POINT)
31 MTC UE APPLICATION
51 HOME SUBSCRIBER SERVER (HSS)
52 DIAMETER ROUTING AGENT (DRA)
53 MOBILITY MANAGEMENT ENTITY (MME)
54 RADIO ACCESS NETWORK (RAN)
55 SERVING GATEWAY (S-GW)
56 PACKET DATA NETWORK GATEWAY (P-GW)
57 TRAFFIC DETECTION FUNCTION (TDF)
101 CONTROL UNIT
501 CONTROL UNIT
561 SIGNALING UNIT
562 PACKET PROCESSING UNIT
571 SIGNALING UNIT
572 DETECTION UNIT

The invention claimed is:

1. An entity comprising:
a transceiver configured to:
receive, from a Service Capability Server (SCS) external to a first network, a first request for background communication, wherein the first request includes a first parameter indicating a value of a condition to be applied for the background communication; and
forward the first parameter, in a second request, to a Policy and Charging Rules Function (PCRF) entity within the first network, to cause the PCRF entity to generate a charging rule for the background communication based on the first parameter.

2. The entity according to claim 1, further comprising a controller configured to select the PCRF entity.

3. The entity according to claim 1, wherein the charging rule indicates a maximum bitrate for the background communication.

4. The entity according to claim 1, wherein the first network is a Third Generation Partnership Project (3GPP) network.

5. A method performed by an entity, the method comprising:
receiving, from a Service Capability Server (SCS) external to a first network, a first request for background communication, wherein the first request includes a first parameter indicating a value of a condition to be applied for the background communication; and
forwarding the first parameter, in a second request, to a Policy and Charging Rules Function (PCRF) entity within the first network, to cause the PCRF entity to generate a charging rule for the background communication based on the first parameter.

6. The method according to claim 5, wherein the first network is a 3GPP network.

7. The method according to claim 5, wherein the charging rule indicates a maximum bitrate for the background communication.

8. A non-transitory computer readable medium storing a program for causing a computer to perform a method related to an entity, wherein the method comprises:
receiving, from a Service Capability Server (SC S) external to a first network, a first request for background communication, wherein the first request includes a first parameter indicating a value of a condition to be applied for the background communication; and
forwarding the first parameter, in a second request, to a Policy and Charging Rules Function (PCRF) entity within the first network, to cause the PCRF entity to generate a charging rule for the background communication based on the first parameter.

9. A Policy and Charging Rules Function (PCRF) entity within a first network, the PCRF entity comprising:
a transceiver configured to receive, from an entity, a first parameter indicating a value of a condition to be applied for a background communication in a second request, wherein the second request is sent by the entity based on a first request for the background communication, wherein the first request is sent by a Service Capability Server (SCS) external to the first network, wherein the first request includes the first parameter, and wherein the first parameter is forwarded to the PCRF entity by the entity in the second request; and
a controller configured to generate, based on the first parameter, a charging rule for the background communication in response to the second request being received by the transceiver.

10. The PCRF entity according to claim 9, wherein the controller is further configured to control at least one of a Policy and Charging Enforcement Function (PCEF) node having a PCEF and a Traffic Detection Function (TDF) node having a TDF in order to apply quality of service to the background communication.

11. The PCRF entity according to claim 10, wherein the controller is further configured to:
in response to receiving the first parameter in the second request, provide, to the TDF node, an Application Detection and Control (ADC) rule for detecting a specific packet flow related to the background communication from user traffic sent or received by a Machine Type Communication (MTC) device through a bearer that is already set up; and
in response to detection of the specific packet flow by the TDF node, provide, to the PCEF node, a Policy and Charging Control (PCC) rule to be applied to the background communication.

12. The PCRF entity according to claim 11, wherein the transceiver is further configured to notify the TDF node of a period when the ADC rule is to be enforced.

13. The PCRF entity according to claim 12, wherein the second request contains designation of a period when the quality of service is to be applied to the background communication, and the transceiver is further configured to notify the TDF node of the period when the ADC rule is to be enforced, which is determined based on the period when the quality of service is to be applied.

14. The PCRF entity according to claim 9, wherein the charging rule indicates a maximum bitrate for the background communication.

15. The PCRF entity according to claim 9, wherein the PCRF entity is selected by the entity.

16. The PCRF entity according to claim 9, wherein the first network is a 3GPP network.

17. A method performed by a Policy and Charging Rules Function (PCRF) entity within a first network, the method comprising:
receiving, from an entity, a first parameter indicating a value of a condition to be applied for a background communication in a second request, wherein the second request is sent by the entity based on a first request for the background communication, wherein the first request is sent by a Service Capability Server (SCS) external to the first network, wherein the first request includes the first parameter, and wherein the first parameter is forwarded to the PCRF entity by the entity in the second request; and
generating, based on the first parameter, a charging rule for the background communication in response to receiving the second request.

18. The method according to claim 17, wherein the first network is a 3GPP network.

19. A non-transitory computer readable medium storing a program for causing a computer to perform a method related to a Policy and Charging Rules Function (PCRF) entity within a first network, wherein the method comprises:
receiving, from an entity, a first parameter indicating a value of a condition to be applied for a background communication in a second request, wherein the second request is sent by the entity based on a first request for the background communication, wherein the first request is sent by a Service Capability Server (SCS) external to the first network, wherein the first request includes the first parameter, and wherein the first parameter is forwarded to the PCRF entity by the entity in the second request; and generating, based on the first parameter, a charging rule for the background communication in response to receiving the second request.

\* \* \* \* \*